Dec. 8, 1936.  F. SZALAY  2,063,206
COLLECTOR FOR ELECTRIC CURRENT
Filed Aug. 17, 1932
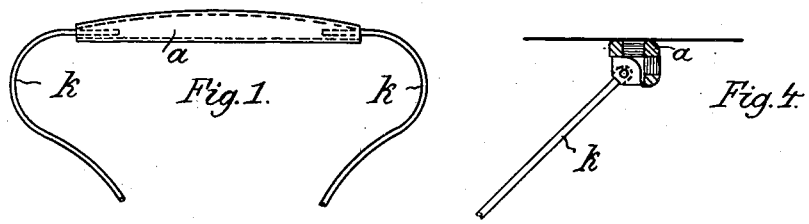
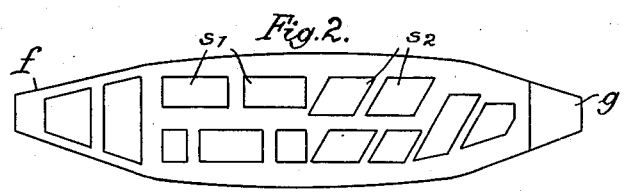
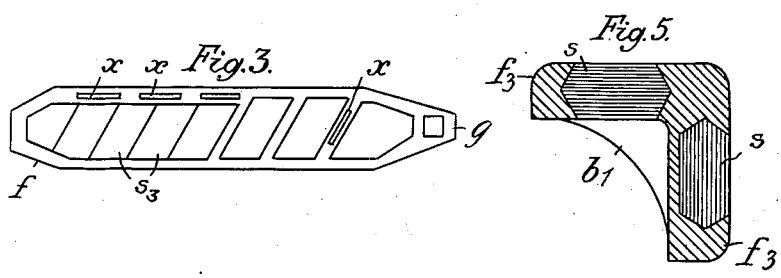
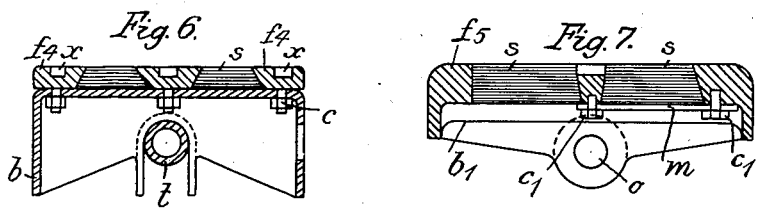
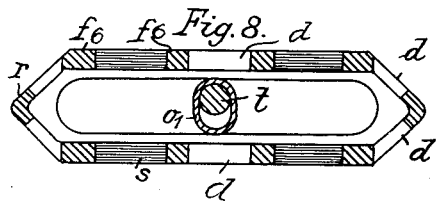
Inventor:
Franz Szalay.

Patented Dec. 8, 1936

2,063,206

UNITED STATES PATENT OFFICE 2,063,206

COLLECTOR FOR ELECTRIC CURRENT

Franz Szalay, Budapest, Hungary

Application August 17, 1932, Serial No. 629,179
In Germany August 20, 1931

2 Claims. (Cl. 191—55)

The invention relates to current collectors for electric railways and more particularly to bow current collectors with one or more, straight or curved sliding surfaces of carbon and metal.

In cases, where interchangeable carbon pieces with metal mounting are used which bring successively metal—carbon—metal into contact with the wire, these are always formed by edgewise mounted carbons which, owing to their small sliding surfaces are easily subjected to wear. In sliding pieces of this kind the metal mountings which merely form a protection, are made of iron strips the comparatively thin cross-section of which comes into contact with the overhead wire and becomes scratched even sooner than the carbon itself. They form therefore neither a permanent protection against the crumbling of the carbon nor are they able to promote considerably the taking up of the current.

The invention, on the other hand, relates to large surfaced current collectors with carbon and metal surfaces, which are rotatably supported. The large sliding surfaces of both materials allow of a lower specific sliding pressure which benefits the durability of both materials especially that of the carbon. These current collectors render the taking up of heavy currents possible. Thus in the disposition adapted in this invention both materials, i. e., carbon and metal participate in the taking up of the current. Carbon is not adapted to be loaded with heavy currents as the structure of the material changes owing to crater formation. The metal body of the new current sliding collector is therefore constructed so that, in itself, without carbon, it is of a sufficiently thick cross-section and also broad enough to be able to resist a maximum of stress.

The fundamental idea of the present invention consists in disposing the metal and carbon parts in the sliding surface in such a way that the metal serves not only as a mechanical protection of the carbon but also for permanently diminishing the load thereon resulting from the taking up of the current. Together with the carbon the metal must therefore continually participate in the taking up of the current. For that reason the carbon parts lying over their full extent in the overhead wire direction in the plane of the sliding surfaces, are bounded on both sides in the travelling direction by metal collecting surfaces, in such a way that the broad carbon surfaces and at the same time the broad metal surfaces slide against the overhead wire. This not only constitutes an excellent protection against breakage, crumbling and combustion of the carbon, but at the same time promotes the current collection as a result of the good conductivity of the metal. The metal prevents the pulverization of the carbon so that the upper part of the car is no longer dirtied by carbon dust. This could not be avoided by the iron sheet mounting hitherto used which so easily becomes notched. A further advantage of the invention is that the sliding surface parts made of metal possessing a good thermal conductivity considerably reduce the heating of the current collector and lend a high mechanical strength to the sliding piece. As a result of the arrangement according to the invention the carbon edges remain permanently protected and the advantages of the assembled carbon—metal—carbon surfaces remain permanently ensured.

Other metal sliding pieces are known in which solid lubricating materials, such as graphite or talcum are fitted into cavities or slots made in the parts sliding along the line. As the cavities are ordinarily made in the middle of the sliding piece and extend transversely to the travelling direction, the solid burnt-in lubricating material is bounded on both sides in the travelling direction by the metal of the sliding bow. These are mere metal sliding pieces with burnt-in graphite or talcum and which are in this way continually lubricated. According to the invention, on the other hand, carbon sliding pieces surrounded on both sides in the travelling direction by metal mounting plates are provided, which latter not only participate in the current collection to a considerable degree, but also protect the carbon against corrosion and damage owing to their greater mechanical strength and tenacity.

The extension of the carbon surfaces, according to the invention, preferably consists of light metal surrounding the carbon surfaces. By using light metal the weight of the current collector is reduced. The use of aluminium or of other cast metals presents the further advantage that the carbon parts conveniently arranged in a mould may have the metal cast around them. In this way it is possible to cast any desired metal shape around any desired form of carbon body.

The new bow current collector thus combines the advantages of both the carbon sliding pieces and the metal sliding pieces.

Fig. 1 of the accompanying drawing represents a view of the collector according to the invention secured to a supporting bow, Figs. 2 and 3 are plan views of different forms of collecting bodies on an enlarged scale, Fig. 4 is a cross-section of the collecting body, and Figs. 5, 6, 7, and 8 are cross-sectional views of different modifications of the collecting body.

The collecting body $a$ is secured to the usual frame or bow $k$ and is formed with a contact surface composed of fields of carbon arranged between borders of metal. The metal portion may consist of a frame or shell $f$ made of light metal of good electric conductivity, for instance an aluminium alloy, and the carbon fields may be obtained by the connection of carbon blocks to the metal support. The shape of the carbon fields may vary. Fig. 2 shows rectangular fields $s_1$ and rhombic fields $s_2$. If, for the purpose of equalizing the wear of the collecting body, the latter tapers towards the ends, as shown at $g$ in Figs. 2 and 3, the carbon fields in the end portions are tapered or reduced to correspond. Each carbon field may be formed from a single carbon block which is isolated by metal from neighbouring blocks. Such an arrangement is shown in Fig. 2. As a modification, several blocks $s_3$ may be arranged in juxtaposition within the same metal border as shown in Fig. 3. The metal borders are formed with lubricating grooves $x$ which are filled with a lubricant suitable for carbon as well as for metal.

Figs. 4 and 5 show a collecting body which is rotatably connected to the supporting bow $k$ and which has two contact surfaces arranged at right angles to each other for opposite directions of travel. The body comprises an L-shaped metal frame $s_3$ having strengthening ribs $b_1$ and being formed with dove-tailed recesses wherein carbon blocks $s$ are accomodated. Preferably the metal frame is cast in a mould containing the carbon blocks so that the latter will be incorporated in the casting.

Fig. 6 shows a metal shell $b$ which is rotatably supported on a shaft $t$ and which has carbon blocks $s$ secured to one of its sides through the medium of dove-tail fillets $f_4$ of metal and screw bolts $c$. The fillets $f_4$ may be united to form a frame.

Fig. 7 shows a shell $f_5$ the end portions of which are formed with apertures $o$ for the reception of a supporting shaft. The shell is formed with strengthening ribs $b_1$ and has dove-tail recesses into which the carbon blocks $s$ are inserted from within the shell, the blocks being secured by means of springs or strips $m$ and screws $c_1$. Preferably the blocks are assembled in the shell while the latter is hot so that the subsequent contraction of the shell will cause the blocks to be firmly secured in position.

In Fig. 8 a flat, hollow metal frame $f_6$ is shown which is mounted by means of transversely elongated apertures $o_1$ on a supporting shaft $t$ and which has carbon blocks $s$ fitted in recesses in both sides. Between the carbon blocks and their borders apertures $d$ are made for reducing the weight of the body. The narrow edges $r$ of the frame are bevelled or roof-shaped.

In all instances the metal borders are flush with the carbon surfaces so that the wire will be swept by metal and carbon simultaneously.

The collector can be made very cheaply and conveniently, particularly if the carbon blocks are cast into the metal, since the blocks may in this case take the form of disused carbon brushes and the like.

Other modifications than those described may be resorted to. For instance the metal borders which embrace the carbon surfaces may be obtained by letting metal strips into a carbon body.

With rotatable collecting bodies according to Figs. 6 to 8, springs or counterweights may be employed, in known manner, for controlling the positions of the body.

I claim:

1. A device for collecting electric current from a trolley wire, comprising a collecting body having a large contact surface composed essentially of carbon and bounded at both sides in the travelling direction by metal surfaces provided with lubricating grooves, the metal surfaces being large enough to relieve the carbon of excessive mechanical and electrical load, and a supporting bow holding the collecting body pivotally and adapted to maintain the wire in contact with the body across the entire surface of carbon as well as metal.

2. A device for collecting electric current from a trolley wire, comprising a collecting body having a large contact surface composed essentially of carbon and bounded at both sides in the travelling direction by metal which is cast round the carbon and provided with lubricating grooves, the metal having contact surfaces large enough to relieve the carbon of excessive mechanical and electrical load, and a supporting bow holding the collecting body pivotally and adapted to maintain the wire in contact with the body across the entire surface of carbon as well as metal.

FRANZ SZALAY.